Figure 1A:
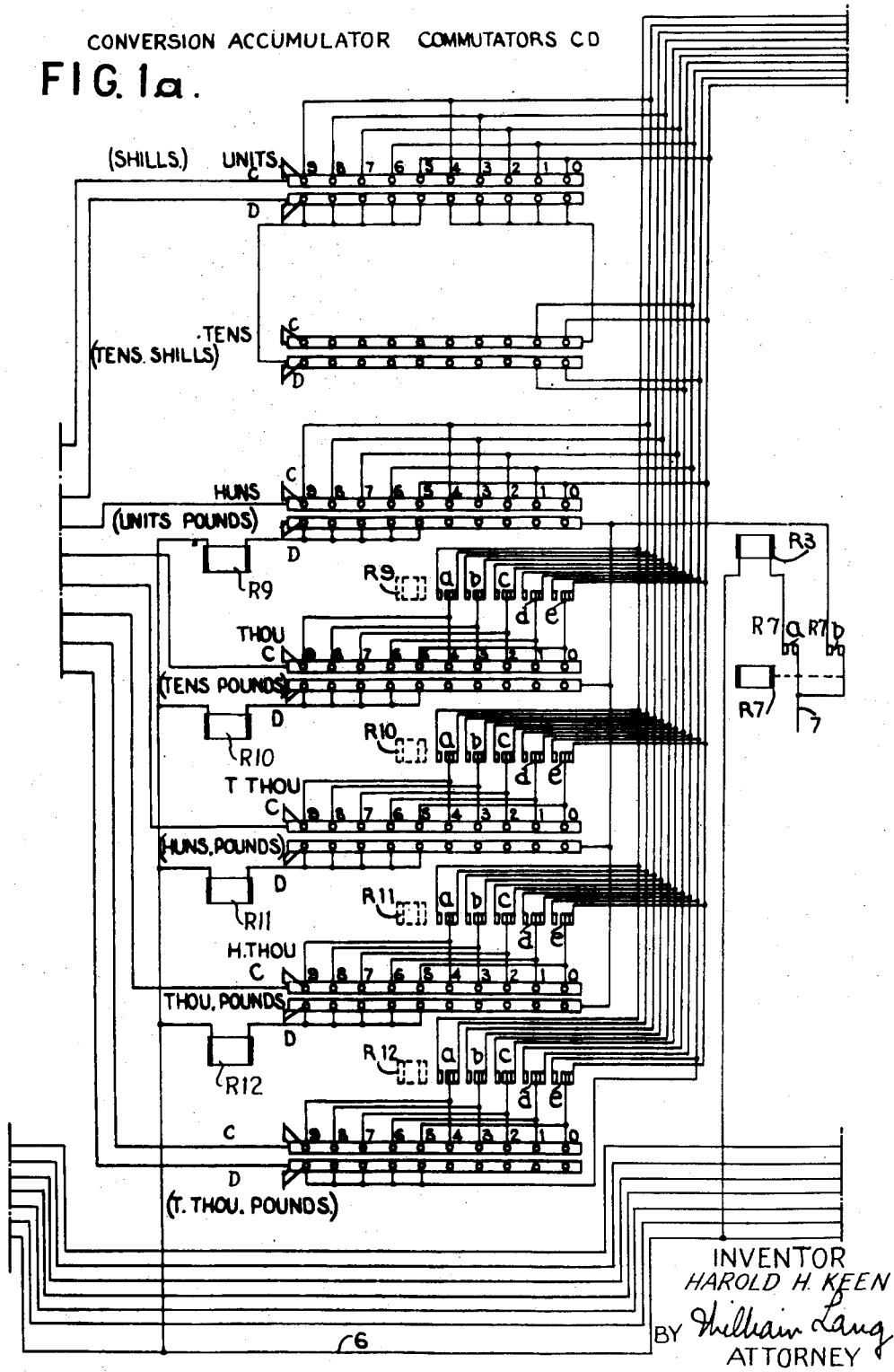

July 8, 1952

H. H. KEEN 2,602,588

MECHANISM FOR CONVERTING STERLING AMOUNTS TO PENCE

Filed Sept. 22, 1950

3 Sheets-Sheet 1

FIG.1.

INVENTOR
HAROLD H. KEEN
BY William Lang
ATTORNEY

July 8, 1952 — H. H. KEEN — 2,602,588
MECHANISM FOR CONVERTING STERLING AMOUNTS TO PENCE
Filed Sept. 22, 1950 — 3 Sheets-Sheet 2

INVENTOR
HAROLD H. KEEN
BY William Lang
ATTORNEY

Patented July 8, 1952

2,602,588

UNITED STATES PATENT OFFICE 2,602,588

MECHANISM FOR CONVERTING STERLING AMOUNTS TO PENCE

Harold H. Keen, Letchworth, England, assignor to International Business Machines Corporation, New York, N. Y., a corporation of New York Application September 22, 1950, Serial No. 186,166
In England October 12, 1949

5 Claims. (Cl. 235—61.6)

This invention relates to means for translating amounts expressed in sterling to the equivalent amount in pence and it is more particularly applicable to record card controlled multiplying and dividing machines.

Record card controlled multiplying machines which work in the decimal notation are well known in the art. It is desirable that such machines be also capable of multiplying a sterling amount by a decimal amount. This may be effected by first converting the sterling value to an equivalent number of pence, performing the required multiplication and then reconverting the result to sterling. It will be appreciated that if these translations can be made using part of the equipment already available in a decimal multiplier, then the cost and complexity of equipment required for conversion of the multiplier to deal with sterling will be appreciably reduced.

Accordingly, an object of the present invention is the provision of translating means for the conversion of a decimal record card controlled multiplier or divider to operate with a sterling multiplicand or dividend.

According to the invention, a translating means whereby a sterling amount may be translated to pence, suitable for use in a record card controlled decimal multiplying or dividing machine, is characterized by means for entering part of the sterling amount on one accumulator and part on a second accumulator and by means for transferring multiples of the amount registered on the first accumulator into the second accumulator and control means operable to determine which denominations of the first accumulator are read into the second accumulator and into which denominations of the second accumulator entry is to be made.

Other objects of the invention will be pointed out in the following description and claims and illustrated in the accompanying drawings, which disclose, by way of examples, the principle of the invention and the best mode, which has been contemplated, of applying that principle.

Figure 1B:
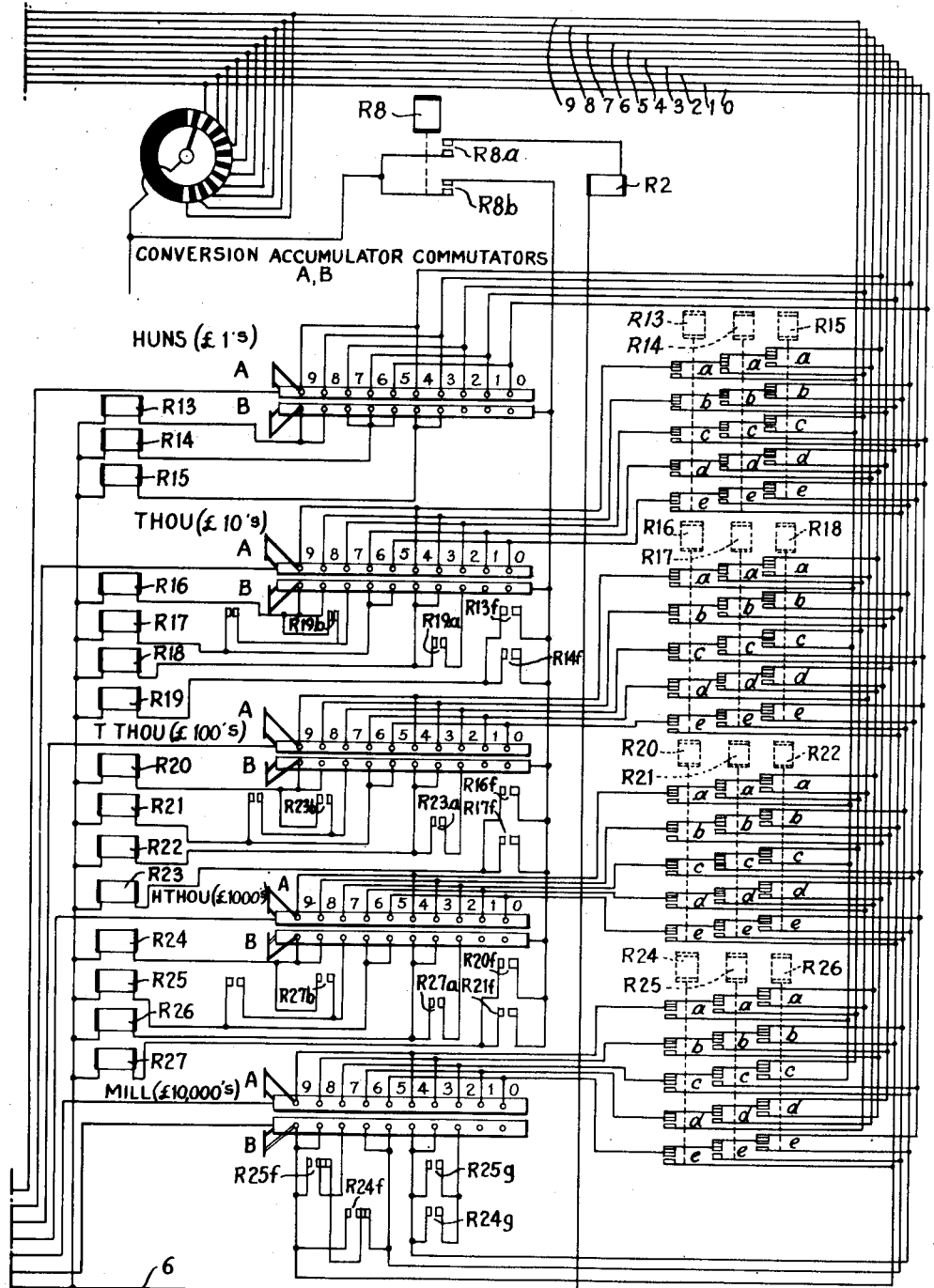

In the drawings:

Figs. 1, 1a and 1b placed side by side comprise a circuit diagram of the preferred form of translator.

It will be appreciated that the translating means of the invention may be used in conjunction with various types of record card controlled multiplying and dividing machines; however, by way of example, it will be described as applied to a machine of the type disclosed in the U. S. patent to J. W. Bryce et al., No. 2,328,610 dated September 7, 1943.

Two accumulators are used in effecting the translation of the sterling amount to pence, one is that which normally contains the multiplicand and the second is an additional accumulator which may be called the conversion accumulator. Both accumulators operate in the decimal system of notation. The connections between the sensing brushes and the accumulators are such that partial entries of the sterling amount are made into both accumulators in the following manner:

| Value | Conversion Accumulator Denomination | Multiplicand Accumulator Denomination |
| --- | --- | --- |
| Pence | | Units. |
| Units of shillings | Units | Tens. |
| Tens of shillings | Tens | Hundreds. |
| Units of pounds | Hundreds | |
| Tens of pounds | Thousands | |

If provision were to be made for higher denominations of pounds, the entries would be made in the appropriate higher denominations of the conversion accumulator only. Since the pence may comprise two denominations, it is arranged that the tens of pence be entered into the tens denomination of the multiplicand accumulator in addition to the units of shillings.

The translation is effected in three cycles, the first being that of entering the sterling value and the second and third being employed to transfer values from the conversion accumulator to the multiplicand accumulator. On the second cycle the value standing in the conversion accumulator is doubled and transferred to corresponding denominations of the multiplicand accumulator, that is, the units value is entered into the units denomination of the multiplicand accumulator, the tens value into the tens denomination and so on. The units and tens of shillings had effectively been multiplied by ten on entry since they were registered in the tens and hundreds denominations of the multiplicand accumulator. In the second cycle twice the units of shillings and tens of shillings value is transferred to the units and tens denominations, so that twelve times the total shillings value is now registered in the multiplicand accumulator.

The units of pounds was entered into the hundreds denomination of the conversion accumulator and was therefore effectively multiplied by one hundred and similarly for other pounds denominations. Thus when twice the values registered in the hundreds and higher denominations of the conversion accumulator is transferred to corresponding denominations of the multiplicand accumulator, this accumulator will register two hundred times the original pounds value in addition to twelve times the shillings value and pence value.

The doubling is effected by a suitably wired accumulator readout circuit in the general manner noted in the reference patent. It will be appreciated that, although the transfer of the shillings value and the pounds value have been described separately for the sake of clarity, in practice the transfer from all denominations of the conversion accumulator occurs at the same time.

In the third cycle, by means of a further readout circuit, the values in the conversion accumulator which related to the pounds denominations only are multiplied by four and transferred to the multiplicand accumulator with a downward column shift of one place, that is the hundreds denomination reads into the tens denomination of the multiplicand accumulator and similarly for higher denominations. Since the pounds value was effectively multiplied by one hundred on entry, the net result of a multiplication by four and a one place column shift is to enter forty times the pounds value into the multiplicand accumulator. Thus in the second and third cycles an overall entry of two hundred and forty times the original pounds value has been entered into the multiplicand accumulator and this together with the twelve times entry of the shillings value in the first and second cycles and the original entry of pence in the first cycle gives the total number of pence equal to the original sterling value.

The card sensing station of Patent No. 2,328,610 is shown partially in Figure 1, only those brushes being shown which are required for sensing the field containing the value of the multiplicand. It will be understood that further brushes are provided for sensing, at the same time, the value of the multiplier from a second field and entering it into the appropriate accumulator. The multiplicand is shown as comprising two denominations of pounds, shillings and pence.

Plug connections 4 are made from the brushes 3 sensing the units of shillings, tens of shillings and pounds columns to the operating magnets R1A to R1D of an accumulator, which may be of the type shown in the reference patent, designated the conversion accumulator. Further connections 5 are made from the brushes 3 sensing the pence, units of shillings and tens of shillings columns to the lower (normally closed) contacts R3a to R3c.

Line 1 is connected to one side of the machine power supply through cam contacts C3 which close at index point times in the usual manner. The line 6 is connected to the other side of the machine power supply.

Suppose that the "4" digit position is perforated in the units of shillings column, then at "4" time a circuit will be made as follows: from one side of the supply, cam contacts C3 (now closed), line 1, contact roll 2, hole in the card at the "4" position, units of shillings brush 3, line 4, magnet R1A of the conversion accumulator, line 6 to the other side of the supply. This energization of the units accumulator magnet at "4" time will cause 4 to be registered in this denomination of the accumulator as described in more detail in the reference patent.

At the same time, a second circuit will be made from the same brush 3, through line 5, contacts R3b (normal), contacts R2b (normal), accumulator magnet R4B of the multiplicand accumulator to line 6. This effects an entry of 4 in the tens denomination of the multiplicand accumulator in the same manner as in the conversion accumulator.

If a "9" had been recorded in the units of shillings column then the circuits just traced would have been made at "9" time to operate the accumulator magnets, thus causing an entry of "9" to be registered in both accumulators. Similar circuits may be traced for effecting the energization of the accumulator magnets in other denominations under control of the appropriate columns of the card. Thus any number from 0 to 9 will be entered into the appropriate denominations of either or both of the accumulators under control of the perforations sensed in the multiplicand field of the card.

In the pence column, provision has to be made for additionally entering the values ten and eleven. For the units and tens denominations of the multiplicand accumulator, additional circuits are provided for the energization of the related carry magnets under control of the cam contacts C1 and C2. During index point times 0 to 9 the lower pair of contacts C1 is closed and contacts C2 are open. During "Y" time the upper pair of contacts C1 is closed and during "X" and "Y" time contacts C2 are closed.

Tenpence and elevenpence are indicated in the usual manner by perforations in the card in the "X" and "Y" positions respectively. When an "X" is sensed no circuit is made to the units magnet of the multiplicand accumulator through contacts C1 from line 5, but a circuit is completed through contacts C2 to the tens denomination carry magnet R6 to enter "1" in the tens denomination. When a "Y" is sensed, circuits are made in parallel through C1 and C2 contacts, to energize units denomination magnet R5 and tens denomination carry magnet R6 to enter "1" in both denominations.

Unit entry magnet R5 and carry magnet R6 may be of the form shown in the patent to H. A. Weinlich et al., No. 1,981,977 dated November 27, 1934, which in Fig. 3 thereof discloses the well known tens carry device, arranged to be magnetically tripped, so that a unit is entered automatically during the tens carry period. For the purposes of the present invention such tripping magnets are provided in the units order of the multiplicand accumulator.

Since an initial entry is being made, no carries can occur due to the entry itself, so that the tripping magnets are free for use for making the direct entry of tenpence and elevenpence.

The entry of the values of the multiplier and multiplicand takes place in one machine cycle. Two further machine cycles are required to complete the translation of the multiplicand. The energization of circuits during these two further cycles is controlled by relays R7 and R8. Relay R7 is energized during the second machine cycle and R8 during the third. The energization of these two relays at the required times may be effected under the control of cams or other well known means.

The units and tens denominations of the conversion accumulator each have two readout commutators, of the type shown in the reference patent and designated C and D. Each of the higher denominations have four readout commutators, two of which are designated C and D (Fig. 1a) and are operative during the second machine cycle of translation. The remaining two are designated A and B (Fig. 1b) and are operative during the third cycle.

In order to make clear the operations taking place during the second and third cycles of operation, a specific numerical example will be considered. The multiplicand value will be taken as £67 : 18 : 11d.

From the description already given of the entry effected during the first cycle, it will be appreciated that the pounds and shillings values will have been entered into the conversion accumulator, so that it will register 6718. The value registered in the multiplicand accumulator will be 191, comprising the shillings and pence values, the entry having been made as initially 180, with 11 added at the end of the sensing cycle due to energization of the units and tens carry magnets.

During the second cycle, as already described, the relay R7 is energized, closing the contacts R7a and R7b. A circuit is then completed from line 7 which is connected to one side of the machine supply, contacts R7a, coil of relay R3 to line 6. Relay R3 is energized and shifts the contacts R3a to R3h.

Through contacts R7b (now closed) a further circuit is made from line 7, contacts R7b, common segment of commutator D of the hundreds order (which is registering 7), segment 7 of the commutator, coil of relay R9 to line 6. A similar circuit causes the energization of relay R10, through the 6 segment of the thousands order commutator D (this order registering 6). Thus relay contacts a to e of the relay R-9 and relay contacts a to e of the relay R-10 are shifted.

An emitter E (Fig. 1b), of known form, provides impulses at index point times from 9 to 0 and these are fed by a series of common lines to the various commutators. The commutators C and D are so wired that the value read out is twice the value registered in the conversion accumulator.

In the units denomination the value registered is 8. At "6" time the following circuit will be made, from line 7, segment 6 of commutator E (Fig. 1b), segment 8 of commutator C, common segment of commutator C (Fig. 1a), upper contacts R3a (now closed) (Fig. 1), lower contacts R2a (normal), lower cam contacts C1, units operating magnet R4A to line 6, which will cause an entry of 6 to be made in the units denomination of the multiplicand accumulator.

In the tens denomination, the value registered is 1. At "3" time a circuit is made from line 7, emitter segment 1 of tens commutator D, common segment, segment 8 of units commutator D, common segment, contacts R3b and R2b, magnet R4B to line 6, to enter "3" in the tens denomination.

The value 7 is registered in the hundreds denomination. At "4" time, the circuit will be from emitter segment 4, segment 7 of hundreds commutator C, to hundreds operating magnet R4C.

The value 6 is registered in the thousands denomination. At "3" time, the circuit is from emitter segment 3, the d contacts of relay R9 (shifted), segment 6 of thousands commutator C, to thousands operating magnet R4D.

Through a similar circuit "1" is entered into the tens of thousands denomination of the multiplicand accumulator.

Thus, at the end of the second cycle of operation, the value 13436 (6718 × 2) has been transferred to the multiplicand accumulator, making the total in this accumulator 13627. It should be noted that the number 13436 represents the shillings and pounds values multiplied by two separately and not the product of the whole number 6718 multiplied by two. For example, 67 pounds multiplied by two equals 134 pounds and 18 shillings multiplied by two equals 36 shillings and the positioning of the separate values alongside one another is merely for convenience.

Before readout on the third cycle commences, relay R7 is denergized and relay R8 is energized. Accordingly, relay R3 is deenergized by the opening of contacts R7a and relay R2 is energized by the closing of contacts R8a. On this cycle the pounds amount, in this example, standing in the hundreds and thousands denominations of the conversion accumulator, is to be multiplied by four and the commutators A and B are wired accordingly.

When contacts R8b (Fig. 1b) close, a circuit is made from line 7, contacts R8b, common segment of hundreds denomination commutator B, segment 7, relay R14 to line 6. Thus relay contacts a to f of relay R14 are closed during this cycle. By a similar circuit through segment 6 of the thousands commutator B, relay R17 is energized, closing contacts a to f of relay R17.

At "8" time, a circuit is made from line 7, emitter segment 8, hundreds commutator A, segment 7 (Fig. 1b), common segment, upper contacts R2b (now closed) (Fig. 1), tens denomination operating magnet R4B to line 6, thus entering 8 in this denomination.

At "6" time, a circuit is made from line 7, emitter segment 6, lower contacts d of relay R14 (now closed), upper contacts d of relay R13 (normal), thousands commutator A, segment 6, common segment, upper contacts R2e, hundreds operating magnet R4C to line 6, to enter 6 in this denomination. A similar circuit may be traced which causes entry of "2" in the tens of thousands demonination.

The entry made into the multiplicand accumulator in the third cycle is 2680, so that the total registerd is now 16307, which is the equivalent in pence of the sterling value £67: 18: 11d.

The operations effected during the three cycles may be summarized as follows:

*Cycle 1*

Pence and shillings are read into the multiplicand accumulator. Shillings value is multiplied by ten, due to units of shillings being read into tens order.

Shillings and pounds are read into the conversion accumulator. Pounds value is effectively multiplied by one hundred due to units of pounds being read into the hundreds order and correspondingly for higher orders.

*Cycle 2*

Twice the value standing in the conversion accumulator is transferred to the multiplicand accumulator. This in effect multiplies the pounds value by two hundred, due to the entry of Cycle 1, and provides a total entry of twelve times the shillings value.

*Cycle 3*

Four times the pounds value standing in the conversion accumulator is transferred to the multiplicand accumulator, with the units of pounds being entered into the tens order, thus effectively multiplying by forty.

At the end of the third cycle, the equivalent pence value is registered in the multiplicand accumulator and the required multiplication may be made. The resulting product may be reconverted to sterling by any convenient method.

It will be appreciated that the initial sterling value might be read into a separate sterling accumulator and the lines 4 connected to the readout mechanism of this accumulator instead of to the brushes 3. This allows of operations being performed on the sterling value before conversion takes place. Further, the functions of this accumulator may be combined with the conversion accumulator. In this case the whole sterling value is first read into the conversion accumulator and then read out cyclically to effect the translation.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a cyclically operable machine controlled by a source record having designations in pounds, shillings and pence, means for reading said designations, an accumulator having denominationally ordered elements, an entry receiving device, operable during one cycle for entering pounds and shillings in said receiving device, means for entering the pence value in the units and tens ordered elements of the accumulator and the units shillings value in the tens order, control means operable in the following cycle for effecting a readout of twice the shillings value and entry thereof into the units and tens order of the accumulator and twice the pounds value into the hundreds and higher orders, column shift devices, and further control means effective during the third cycle for effecting a readout of four times the ten pounds value from the entry receiving device through said column shift devices into said accumulator whereby the total in the accumulator will represent the equivalent pence value of the starting amount read from the source record.

2. In a cyclically operable machine controlled by a source record having designations in pounds, shillings and pence, means for reading said designations, an accumulator having denominationally ordered elements, an entry receiving device, operable during one cycle for entering the units and tens of shillings in the units and tens ordered elements of the receiving device and the units of pounds into the hundreds order to effectively multiply the pounds by one hundred, means for entering the pence value in the units and tens ordered elements of the accumulator and the units shillings value in the tens order thereby multiplying the shillings value by ten, control means operable in the following cycle for effecting a readout of twice the shillings value and entry thereof into the units and tens order of the accumulator and twice the pounds value into the hundreds and higher orders, column shift devices, and further control means effective during the third cycle for effecting a readout of four times the pounds value from the entry receiving device through a downward column shift of said column shift devices into said accumulator to effect an overall entry of two hundred forty times the original pounds value, whereby the total in the accumulator will represent the equivalent pence value of the starting amount read from the source record.

3. In a cyclically operable machine controlled by a source record having designations representing a sterling amount in pounds, shillings and pence denominations, means for reading said designations, an accumulator having denominationally ordered elements, an entry receiving device, means for entering certain denominations of the sterling amount on the entry receiving device and another denomination on the accumulator, control means operable in the following cycle for transferring multiples of each denomination of the amount registered on the entry receiving device into the accumulator, column shift devices, and further control means effective during the third cycle for effecting a readout of a multiple of one denomination of the sterling amount standing in the entry receiving device through said column shift devices into said accumulator whereby the total in the accumulator will represent the equivalent of the starting sterling amount read in a given denomination.

4. In a cyclically operable machine controlled by a source record having designations representing a sterling amount in pounds, shillings and pence denominations, means for reading said designations, an accumulator having denominationally ordered elements, means for entering the pence denomination on the accumulator, control means operable in the following cycle for entering multiples of the pounds and shillings denominations into the accumulator, column shift devices, and further control means effective during the third cycle for effecting a readout of multiples of the pounds denomination of the sterling amount through said column shift devices into said accumulator whereby the total in the accumulator will represent the equivalent of the starting sterling amount read in a given denomination.

5. In a machine of the class described, means to sense a column of a record card by index point positions representative of values 9, 8, 7, 6, 5, 4, 3, 2, 1, 0, 11, 12, an accumulator including a tens carry device and a unit entry device intermediate the denominationally ordered elements thereof, direct entry means for the accumulator, means controlled by the sensing means, for operating said entry means of the units order upon sensing of a designation in any of the positions 9 to 0, inclusive, further means controlled by the sensing means for operating the tens carry device of the units order upon sensing of a designation in the 11 position and further means effective upon sensing a designation in the 12 position for effecting an entry of a unit in the units and tens orders.

HAROLD H. KEEN.

REFERENCES CITED

The following references are of record in the file of this patent:

UNITED STATES PATENTS

| Number | Name | Date |
| --- | --- | --- |
| 2,066,764 | Campbell | Jan. 5, 1937 |
| 2,338,206 | Shafer | Jan. 4, 1944 |